US012626468B2

(12) United States Patent
Gupta et al.

(10) Patent No.: US 12,626,468 B2
(45) Date of Patent: May 12, 2026

(54) HYPER-PERSONALIZED AUGMENTED OBJECTS

(71) Applicant: Flying Flamingos India Pvt. Ltd., Bangalore (IN)

(72) Inventors: Rajat Gupta, New Delhi (IN); Shourya Agarwal, Ajmer (IN); Malhar Patil, Nagpur (IN); Prakharkumar Srivastava, Rajkot (IN); Kalpit Singh Kushwaha, Jaipur (IN)

( * ) Notice: Subject to any disclaimer, the term of this patent is extended or adjusted under 35 U.S.C. 154(b) by 182 days.

(21) Appl. No.: 18/710,837

(22) PCT Filed: Nov. 19, 2022

(86) PCT No.: PCT/IN2022/051015
§ 371 (c)(1),
(2) Date: May 16, 2024

(87) PCT Pub. No.: WO2023/089637
PCT Pub. Date: May 25, 2023

(65) Prior Publication Data
US 2025/0014287 A1 Jan. 9, 2025

(30) Foreign Application Priority Data
Nov. 19, 2021 (IN) .............................. 202141053367

(51) Int. Cl.
*G06T 19/00* (2011.01)
*G06F 3/01* (2006.01)
(Continued)

(52) U.S. Cl.
CPC ............ *G06T 19/006* (2013.01); *G06F 3/017* (2013.01); *G06T 19/20* (2013.01); *G06V 20/20* (2022.01);
(Continued)

(58) Field of Classification Search
CPC .................. G06T 19/006; G06T 19/20; G06T 2219/2016; G06T 2219/2021; G06T 11/00;
(Continued)

(56) References Cited

U.S. PATENT DOCUMENTS

2018/0300788 A1* 10/2018 Mattingly .......... G06Q 30/0625
2019/0362554 A1 11/2019 Chen et al.
(Continued)

OTHER PUBLICATIONS

International Search Report Dated Feb. 24, 2023.
(Continued)

*Primary Examiner* — Grace Q Li
(74) *Attorney, Agent, or Firm* — Novel Patent Services LLC

(57) ABSTRACT

A system for presenting hyper-personalized content over objects is provided. The system determines context features based on digital media, sensor data, and a user profile of a user of a mobile device. The system computes a context vector representing a context associated with the digital media and the user based on a correlation of the context features and compares the context vector with a plurality of context vectors of a plurality of multimedia content. The system selects, from the plurality of multimedia content, a multimedia content based on the comparison of the context vector with the plurality of context vectors. The system renders, on a display of the mobile device, an augmented reality presentation in which the selected multimedia content is superimposed on a target object displayed in the digital media. The augmented reality presentation is hyper-personalized to map to the context associated with the user.

20 Claims, 9 Drawing Sheets

(51) Int. Cl.
    *G06T 19/20*        (2011.01)
    *G06V 20/20*        (2022.01)

(52) U.S. Cl.
    CPC ................. *G06T 2219/2016* (2013.01); *G06T 2219/2021* (2013.01); *G06V 2201/07* (2022.01)

(58) Field of Classification Search
    CPC ....... G06F 3/017; G06F 16/438; G06V 20/20; G06V 2201/07; G06V 30/2247; G06V 2201/10
    See application file for complete search history.

(56)              References Cited

U.S. PATENT DOCUMENTS

2021/0034708 A1\*   2/2021   Prasad ..................... G06N 3/09
2021/0064127 A1    3/2021   Park et al.

OTHER PUBLICATIONS

Written Opinion of The International Searching Authority Dated Feb. 24, 2023.
International Preliminary Report on Patentability Dated Aug. 3, 2023.

\* cited by examiner

HYPER-PERSONALIZED AUGMENTED OBJECTS

CROSS-REFERENCE TO RELATED APPLICATION

The instant application is a national phase of PCT International Application No. PCT/IN2022/051015 filed Nov. 19, 2022, and claims priority to Indian Patent Application Serial No. 202141053367 filed Nov. 19, 2021, the entire specifications of both of which are expressly incorporated herein by reference.

BACKGROUND

Field of the Disclosure

Various embodiments of the disclosure relate generally to computer vision. More particularly, various embodiments of the present disclosure relate to hyper-personalized augmented objects.

Description of the Related Art

People have been known to exchange messages through digital media. A receiver is able to view or listen to the digital media; however, the digital media cannot be recycled to suit different contextual situations of the underlying objects. For example, objects, such as greeting cards, do not change their message based on the receiver or an event at which the receiver receives the objects. Additionally, the receiver cannot interact or change content being portrayed by the objects.

In light of the above, there is a need for a technical solution that enhances perceived utility of objects for communication and/or entertainment purposes.

SUMMARY

A system for hyper-personalized augmented objects is provided substantially as shown in, and described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

The accompanying drawings illustrate the various embodiments of systems, methods, and other aspects of the disclosure. It will be apparent to a person skilled in the art that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa.

Various embodiments of the present disclosure are illustrated by way of example, and not limited by the appended figures, in which like references indicate similar elements.

Figure 1A:
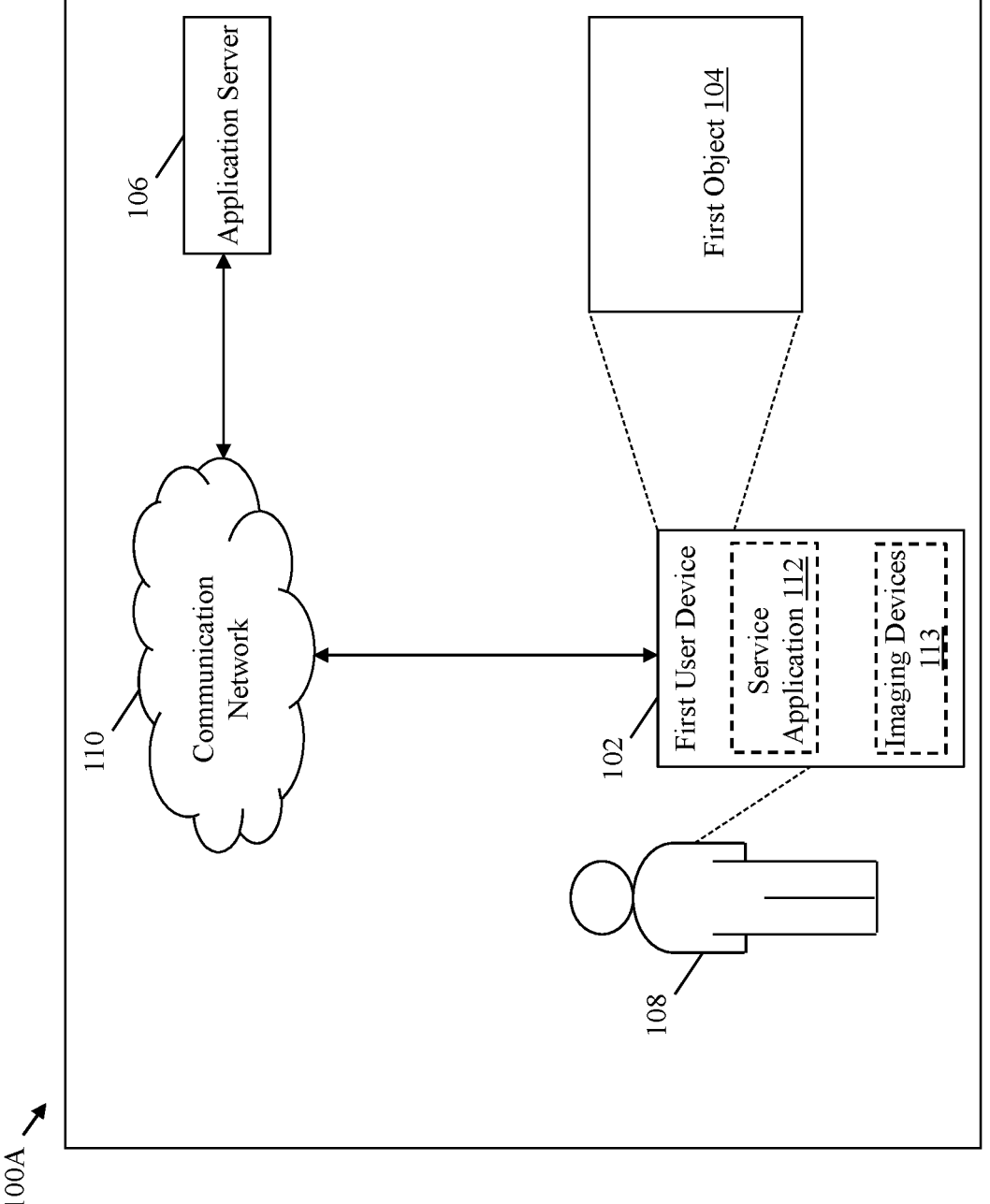
FIG. 1A is a block diagram that illustrates a system environment for presenting hyper-personalized augmented objects, in accordance with an exemplary embodiment of the present disclosure.

Further areas of applicability of the present disclosure will become apparent from the detailed description provided hereinafter. It should be understood that the detailed description of exemplary embodiments is intended for illustration purposes only and is, therefore, not intended to necessarily limit the scope of the disclosure.

DETAILED DESCRIPTION

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. In one example, the teachings presented and the needs of a particular application may yield multiple alternate and suitable approaches to implement the functionality of any detail described herein. Therefore, any approach may extend beyond the particular implementation choices in the following embodiments that are described and shown.

References to "an embodiment", "another embodiment", "yet another embodiment", "one example", "another example", "yet another example", "for example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Exemplary aspects of the disclosure provide a system. The system includes a memory configured to store a database. The database includes a mapping between a plurality of multimedia content and a first target object. The database further includes a plurality of context vectors of the plurality of multimedia content. Each of the plurality of context vectors corresponds to a numerical representation of a context of a corresponding multimedia content of the plurality of multimedia content. The system further includes a transceiver and a processor. The transceiver receives a digital media being captured by one or more imaging devices associated with a mobile device. The digital media displays the first target object. The transceiver further receives sensor data generated by one or more sensors of the mobile device. The sensor data is generated by the one or more sensors during the capture of the digital media. The processor determines one or more context features based on one or more of (i) the digital media, (ii) the sensor data, and (iii) a user profile of a user of the mobile device. The processor further computes a context vector representing a context associated with the digital media and the user based on a correlation of the determined one or more context features. The processor further compares the computed context vector with the plurality of context vectors and selects, from the plurality of multimedia content, a multimedia content based on the comparison of the computed context vector with the plurality of context vectors. The processor further renders, on a display of the mobile device, an augmented reality presentation in which the selected multimedia content is superimposed on the first target object displayed in the digital media. The augmented reality presentation is hyper-personalized to map to the context associated with the user.

In another embodiment, a method is provided. The method includes storing, by a memory of a system, a database. The database includes (i) a mapping between a plurality of multimedia content and a first target object and (ii) a plurality of context vectors of the plurality of multimedia content. Each of the plurality of context vectors corresponds to a numerical representation of a context of a corresponding multimedia content of the plurality of multimedia content. The method further includes receiving, by a transceiver of the system, a digital media being captured by one or more imaging devices associated with a mobile device, wherein the digital media displays the first target object. The method further includes receiving, by the transceiver of the system, sensor data generated by one or more sensors of the mobile device. The sensor data is generated by the one or more sensors during the capture of the digital media. The method further includes determining, by a processor of the system, one or more context features based on one or more of (i) the digital media, (ii) the sensor data, and (iii) a user profile of a user of the mobile device. The method further includes computing, by the processor of the system, a context vector representing a context associated with the digital media and the user based on a correlation of the determined one or more context features. The method further includes comparing, by the processor of the system, the computed context vector with the plurality of context vectors. The method further includes selecting, by the processor of the system, from the plurality of multimedia content, a multimedia content based on the comparison of the computed context vector with the plurality of context vectors. The method further includes rendering, by the processor of the system, on a display of the mobile device, an augmented reality presentation in which the selected multimedia content is superimposed on the first target object displayed in the digital media. The augmented reality presentation is hyper-personalized to map to the context associated with the user.

In another embodiment, the processor processes the digital media to identify the first target object in the digital media and searches the database to retrieve the plurality of multimedia content mapped to the first target object based on the identification of the first target object in the digital media. The identification of the first target object includes identification of one or more of a shape, a size, a surface curvature, and a three-dimensional model of the first target object. The processor is further configured to transform the selected multimedia content in accordance with at least one of the shape, the size, and the surface curvature of the first target object. The selected multimedia content is transformed prior to the superimposition on the first target object, and the multimedia content superimposed on the first target object is the transformed multimedia content.

In another embodiment, the processor is configured to identify a second target object in the digital media and select another multimedia content from the database based on the identification of the second target object in the digital media. The processor is configured to update, on the display of the mobile device, the augmented reality presentation to superimpose the selected other multimedia content on the second target object. The other multimedia content is superimposed on the second target object concurrently with the multimedia content being superimposed on the first target object.

In another embodiment, the processor is configured to detect a trigger action based on one or more of (i) the digital media, (ii) the superimposed multimedia content, and (iii) the sensor data and select another multimedia content from the plurality of multimedia content based on the detected trigger action. The processor is further configured to update, on the display of the mobile device, the augmented reality presentation to superimpose the selected other multimedia content concurrently with the multimedia content on the first target object. The other multimedia content is superimposed on the second target object concurrently with the multimedia content being superimposed on the first target object.

In another embodiment, the processor is configured to detect a trigger action based on the digital media and the sensor data and manipulate the multimedia content superimposed on the first target object in accordance with the trigger action to create a perception of the multimedia content being altered in response to the trigger action. The trigger action is one of a gesture made by the user of the mobile device and an environmental input recorded in one of the digital media and the sensor data. The processor manipulates the multimedia content superimposed on the first target object in accordance with the trigger action after a time delay.

In another embodiment, the transceiver is configured to receive, from the mobile device, a signal indicating that a first gesture is made by the user on a multimedia item being displayed during the augmented reality presentation. The transceiver is configured to receive, from the mobile device, another signal indicating that a second gesture is made by the user as a follow-up to the first gesture. The other signal includes an image frame captured by the mobile device at the time the second gesture was made by the user. The processor is configured to map the multimedia item with the image frame captured by the mobile device at the time the second gesture was made by the user and store the mapping between the multimedia item and the image frame in the database for subsequent augmented reality presentation.

In another embodiment, the processor is configured to authenticate the user of the mobile device prior to rendering the augmented reality presentation based on authentication information received from the mobile device. The authentication information includes one or more of a faceprint of the user, fingerprints of the user, iris scan of the user, retina scan of the user, a voiceprint of the user, a facial expression code, a secret code, a secret phrase, a public key, and an account identifier-password pair.

In another embodiment, the transceiver is configured to stream the selected multimedia content to the mobile device for rendering the augmented reality presentation on the mobile device. The plurality of multimedia content includes two or more of a video content, an audio-video content, special effects, three-dimensional virtual objects, augmented reality filters, and emoticons. The digital media is one of a live image, a live video, an image of another image, and a video of another video. The digital media is one of a two-dimensional (2D) image, three-dimensional (3D) image, a 2D video, and a 3D video. The one or more context features include at least one of demographics of the user, a geo-location of the mobile device, a current season, a current timestamp, identity variables of the user, a travel history of the user, event information associated with the user, and current affairs information.

FIG. 1A is a block diagram that illustrates a system environment for presenting hyper-personalized augmented objects, in accordance with an exemplary embodiment of the present disclosure. Referring now to FIG. 1A, an environment 100A that includes a first user device 102, a first target object 104, an application server 106, a first user 108, and a communication network 110 is shown. The application server 106 and the first user device 102 (and other user devices) may communicate with each other by way of the communication network 110.

The first user device 102 may include suitable logic, circuitry, interfaces, and/or code, executable by the circuitry, that may be configured to execute one or more instructions based on user input received from the first user 108. The first user device 102 is further configured to execute a service application 112. In a non-limiting example, the first user device 102 may be configured to perform various operations, for example, under the control of the service application 112, to visually scan various objects (e.g., the first target object 104). In other words, the first user device 102 may include an imaging system (e.g., front and back imaging devices 113) or may be communicatively coupled to a plurality of imaging devices that enable the first user device 102 to scan (e.g., photograph, shoot, visually capture, or visually record) surrounding objects. For the sake of brevity, the terms "imaging systems", "imaging devices", and "cameras" are used interchangeably throughout the disclosure. The camera(s) may be accessed by way of the service application 112 installed (e.g., executed) on the first user device 102.

The service application 112 may be a standalone application or a web-based application that is accessible by way of a web browser installed (e.g., executed) on the first user device 102. The service application 112 may be hosted by the application server 106. The service application 112 renders, on a display of the first user device 102, an interactive graphical user interface (GUI) that enables the first user 108 to access an augment reality system (e.g., augmented reality service) offered by the application server 106. For example, the interactive GUI may be manipulated by the first user 108 to access the augment reality system (e.g., augmented reality service) offered by the application server 106. For manipulating the interactive GUI, the first user 108 may select various options presented on the GUI. Further, the first user device 102 may be utilized by the first user 108 to perform various operations such as, but not limited to, viewing content (e.g., pictures, audio, video, or the like), downloading content, uploading content, creating content, or the like.

Examples of the first user device 102 may include, but are not limited to, a smartphone, a tablet, a phablet, a laptop, digital camera, or the like. For the sake of brevity, it is assumed that the first user device 102 is a smartphone.

Examples of the first target object 104 may include physical objects such as, but not limited to, photos, photo frames, business cards, flyers, billboards, household objects, animals, humans, buildings, or other objects available in three-dimensional real world. In other words, the first target object 104 may include any living object or non-living object that can be scanned (e.g., photographed or visually recorded) by way of the first user device 102. In one embodiment, the first target object 104 may further include identification markers such as, but not limited to, barcodes, quick response (QR) codes, numeric codes, alphanumeric codes, or any other type of machine readable optical code. However, in another embodiment, the first target object 104 may not include any identification markers.

The application server 106 may include suitable logic, circuitry, interfaces, and/or code, executable by the circuitry that may be configured to host the service application 112 and perform one or more operations associated with the implementation and operation of the augmented reality system. The application server 106 in conjunction with the service application 112 may form the augmented reality system. The application server 106 may be implemented by one or more processors, such as, but not limited to, an application-specific integrated circuit (ASIC) processor, a reduced instruction set computing (RISC) processor, a complex instruction set computing (CISC) processor, and a field-programmable gate array (FPGA) processor. The one or more processors may also correspond to central processing units (CPUs), graphics processing units (GPUs), network processing units (NPUs), digital signal processors (DSPs), or the like. It will be apparent to a person of ordinary skill in the art that the application server 106 may be compatible with multiple operating systems.

The communication network 110 may include suitable logic, circuitry, interfaces, and/or code, executable by the circuitry that may be configured to transmit queries, information, content, format, and requests between various entities, such as the first user device 102, and/or the application server 106. Examples of the communication network 110 may include, but are not limited to, a wireless fidelity (Wi-Fi) network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and a combination thereof. Various entities in the environment 100A may connect to the communication network 110 in accordance with various wired and wireless communication protocols, such as Transmission Control Protocol and Internet Protocol (TCP/IP), User Datagram Protocol (UDP), Long Term Evolution (LTE) communication protocols, or any combination thereof.

In operation, the first user 108 may open the service application 112 running on the first user device 102. In an example, the first user 108 may open the service application 112 in a creator mode. The service application 112 running on the first user device 102 may access the camera (e.g., front and back cameras 113) of the first user device 102 or one or more cameras that are communicatively coupled to the first user device 102. The first user 108 may scan the first target object 104 (e.g., click a photo, record a video of the first target object 104) using the camera(s). In one embodiment, the service application 112 may be configured to detect and/or recognize the first target object 104 that is being scanned. For example, in a scenario in which the first target object 104 is a business card, the service application 112 may detect boundaries or edges of the business card.

Further, the service application 112 may recognize the first target object 104 as a business card. Similarly, in a scenario in which the camera scans a poster of a celebrity, the service application 112 may detect a face of the celebrity, as the first target object 104, in the poster. Further, the service application 112 may recognize the celebrity (e.g., match the detected face to an identity of the celebrity). Similarly, in a scenario in which the first target object 104 is a physical structure (e.g., a building, a monument, or the like), the service application 112 may detect boundaries of the scanned physical structure. Further, the service application 112 may recognize the physical structure (e.g., match scanned physical structure to a known physical structure). For example, when the Eiffel Tower is scanned or a photo of the Eiffel Tower is scanned, the service application 112 may recognize the scanned object (e.g., the first target object 104) as the Eiffel Tower. A still image, a live image, or a video (with or without machine readable optical code) captured by the camera(s) is referred to as a first digital media (shown later in FIG. 2) that includes the first target object 104 therein. In an embodiment, the first digital media, along with the first target object 104, may include other objects that were present in the viewing angle of the camera(s).

Upon generation of the first digital media, the service application 112 may prompt the first user 108 to provide content that is to be mapped to (e.g., associated with or linked to) the generated first target object 104. Based on the prompt, the first user 108 may, by way of the service application 112, record multimedia content, upload multimedia content, download multimedia content, or select multimedia content that is to be mapped to the first target object 104. For example, the first user 108 may record a video of herself singing a song, by way of the camera included in the first user device 102. In another example, the first user 108 may select and upload, from a plurality of videos stored in a memory of the first user device 102, one or more videos (e.g., a snippet from a movie) that are to be mapped to the first target object 104. In another example, the first user 108 may select, from a set of available content offered by the service application 112, multimedia content that are to be mapped to the first target object 104.

In an embodiment, the first user 108 may select a plurality of multimedia content for mapping to the first target object 104. The plurality of multimedia content may vary in context. For example, the first user 108 may select and upload a first video (e.g., a birthday celebration video) and a second video (e.g., a new year celebration video) for mapping to the first target object 104, e.g., a gift box. Context of a multimedia content may be automatically derived by the service application 112 based on determination and inference of various context features associated with the multimedia content. For example, the first video may include a snippet of a birthday cake indicating a context feature (e.g., event) to be a birthday celebration, whereas the second video may have people singing a new year song, thus indicating the context feature (e.g., event) to be a new year celebration. Examples of context features may include a location, a season, a time instance, event information, an activity, visual objects displayed in a multimedia content, a genre, or the like. In other words, the context features may include any such parameter that may be indicative of a context of a multimedia content. For deriving, context features from a multimedia content, the service application 112 may be configured to run object recognition, text recognition, image processing, image recognition, image classification, face recognition, metadata processing, or the like on the multimedia content.

For the sake of brevity, it is assumed in the current embodiment that the first digital media is to be mapped to two multimedia content (e.g., a first video and a second video). The two multimedia content that are mapped to the first target object 104, for example, a gift box, are referred to as "first multimedia content" and "second multimedia content". It will be apparent to those of skill in the art that the type of multimedia content that is selected may correspond to one or more of a plurality of formats such as, but not limited to, joint photographic experts group (JPEG), portable network graphics (PNG), moving pictures experts group audio layer-3 (MP3), moving pictures experts group-4 (MP4), free lossless audio codec (FLAC), graphics interchange format (GIF), audio-video content, or the like. It will be apparent to those of skill in the art that the first target object 104 may be simultaneously linked to multiple types and/or pieces of content without deviating from the scope of the disclosure.

In one embodiment, the service application 112 may enable the first user 108 to map additional multimedia content, for example, a plurality of special effects, to the first target object 104. The plurality of special effects may include, but are not limited to, image filters, video filters, virtual two-dimensional (2D) emojis, virtual three-dimensional (3D) emojis, virtual flora, virtual fauna, 3D objects, or the like. The plurality of special effects may include augmented reality elements (e.g., the 3D emojis, the virtual flora, the virtual fauna, or the like).

For the sake of brevity, it is assumed in the current embodiment that the first user 108 further selects special effects (e.g., third multimedia content) for mapping to the first target object 104. Following the addition or selection of the special effects, the service application 112 may communicate a first content generation request to the application server 106. The first content generation request may include or may be indicative of the first digital media including the first target object 104, the selected plurality of multimedia content (e.g., the first through third multimedia content), and the context features derived for each of the plurality of multimedia content. In other words, the application server 106 may receive a signal in the form the first content generation request from the first user device 102 indicating that the first target object 104 is to be mapped to the selected plurality of multimedia content.

Based on the first content generation request or the signal, the application server 106 may be configured to generate a context vector for each of the plurality of multimedia content. The context vector of a multimedia content may be generated based on a correlation of the context features derived for the multimedia content. The context vector may correspond to a numerical representation (for example, an 'n' dimensional array) of a context of a multimedia content. The application server 106 may utilize one or more known techniques (for example, word-to-vector technique) to generate a plurality of context vectors for the plurality of multimedia content, respectively.

The application server 106 may store, in a database (shown in FIG. 5), the first digital media, the plurality of multimedia content, and the plurality of context vectors of the plurality of multimedia content. The database stored in a memory of the application server 106 is updated to include the mapping between the plurality of multimedia content and the first target object 104. An entry in the database that stores the first digital media, the plurality of multimedia content, and the plurality of context vectors of the plurality of multimedia content corresponds to a mapping between the plurality of multimedia content and the first target object 104.

Each content generation request may be associated with a unique identifier. For example, the application server 106 may further store, in the database, a first identifier that is associated with the first target object 104, the plurality of multimedia content, and the plurality of context vectors of the plurality of multimedia content. The first identifier may uniquely identify data (e.g., the first target object 104, the plurality of multimedia content, and the context labels of the plurality of multimedia content) associated with the first content generation request. In other words, the first identifier uniquely identifies the mapping between the plurality of multimedia content and the first digital media.

It will be apparent to those of skill in the art that the database is not limited to storing only above-mentioned data. For example, the database may also store metadata associated with the first target object 104, identification details of the first user 108, identification details of the first user device 102, identification details of one or more other users authorized (e.g., by the first user 108) to view the plurality of multimedia content, or a timestamp indicative of a time of reception of the first content generation request. The database may also store a timestamp indicative of content expiry time set by the first user 108 (e.g., a time at which the first multimedia content is to expire), details of one or more trigger moments or actions for the rendering the special effects, or the like.

Trigger moments or trigger actions may be set or defined by the first user 108 or the application server 106 to define actions or moments at which the special effects are to be triggered during playback of the selected multimedia content. For the sake of ongoing description, setting of trigger action(s) is described with respect to the first user 108.

For example, the first user 108 may define that the special effects may only be rendered in conjunction with the first multimedia content and may not be rendered during the rendering of the second multimedia content. In an embodiment, the special effects may be triggered and rendered upon detecting a specific gesture (e.g., audio gesture or visual gesture) in the multimedia content during the playback. For example, the selected first multimedia content may include a video of opening of a gift box and the special effects may be set to trigger when the gift box is opened (e.g., trigger action). Similarly, in another example, the special effects may be triggered and rendered at a specific time-instant or timestamp (e.g., "00:10", or "02:00"; "minutes:seconds" format) in the playback as specified (e.g., trigger moment). In another example, the special effects may be triggered and rendered upon detecting a specific gesture (e.g., audio gesture or visual gesture) of a user viewing the playback or specific environmental inputs. In other words, the trigger actions may be defined with respect to the plurality of multimedia content, user gestures, or environmental inputs of the 3D real world.

In one embodiment, the first user 108 may share the first digital media with a second user (shown later in FIG. 4B). In other words, the first user device 102 may be utilized by the first user 108 to communicate the first digital media to a second user device (shown in FIGS. 3A, 3B, 4A, and 4B) of the second user. For the sake of brevity, it is assumed that the second user device is functionally similar to the first user device 102 and executes the service application 112 thereon. In another example, the second user device may be a head mounted display associated with a plurality of imaging devices. In an example, the plurality of imaging devices may include imaging devices mounted on walls, ceilings, in-built cameras of the head mounted display, or the like without deviating from the scope of the disclosure. In another embodiment, the first user 108 may print the first digital media (e.g., by using a printer) and provide it to the second user for augmented reality experience. The printout of the first digital media is referred to as "first printed image card" throughout the disclosure.

Consequently, the service application 112 that is executed on the second user device may be accessed by the second user in a viewer mode. The GUI of the service application 112 may include options to scan printed image cards (e.g., take an image of another image), scan playback of videos (e.g., record video of another video), or scan surrounding scenes of the second user to capture live images or videos for augmented reality presentation. The service application 112 may access a camera that is included in or communicatively coupled to the second user device based on the selection of one of the options. The service application 112 may the display camera feed (e.g., second digital media) captured by the camera(s) on a display of the second user device.

When the second user device is directed towards (e.g., pointed towards) the first printed image card, the displayed camera feed (e.g., the second digital media) may display the first printed image card which has the first target object 104 therein. In a scenario, when the second user device is directed to capture an image or video of the surroundings (e.g., 3D real world environment), the displayed camera feed (e.g., the second digital media) may display a scene captured by the viewing angle of the camera. In an example, the camera feed (e.g., the second digital media) may be a 2D image, 3D image, a 2D video, or a 3D video. In a non-limiting example, it is assumed that the second user device is utilized to scan the first printed image card as the second digital media.

The service application 112 may communicate a first multimedia content viewing request to the application server 106. The first multimedia content viewing request may include or may be indicative of the captured second digital media. The first multimedia content viewing request may further include sensor data of one or more sensors (shown in FIG. 3A-4B) included in the second mobile device and a timestamp of the first multimedia content viewing request. The one or more sensors may include an accelerometer, an ambient light sensor, an ambient temperature sensor, an air humidity sensor, a barometer sensor, a finger print sensor, a gyroscope sensor, a magnetometer, a short range communication sensor, a microphone, a proximity sensor, or the like. The sensor data may include current location data, current weather data, current temperature data, audio data from the surroundings, ambient light exposure, or the like associated with the second mobile device. The sensors may have captured the sensor data during the capture of the second digital media by the second user device. The first content viewing request may further include metadata associated with the second digital media and information of a user profile of the second user. The user profile may be a social media profile of the second user that indicates likes, dislikes, events (e.g., birthdays, anniversaries, or the like) demographic details, travel details, or the like of the second user. In an embodiment, the service application 112 may have requested permission from the second user to access the social media profile of the second user.

Thus, the application server 106 may receive from the second mobile device, via the service application 112, the first multimedia content viewing request including the captured second digital media along with abovementioned information. The application server 106 may process the captured second digital media to identify or recognize the first target object 104 included in the second digital media. In other words, the application server 106 may identify the first target object 104 in the second digital media, e.g., camera feed generated by scanning the first printed image card. Identification of the first target object 104 may further include identification of one or more of a shape, a size, a surface curvature, and a three-dimensional model of the first target object 104 using one or more object recognition techniques.

The application server 106 may then search the database by way of a query to retrieve any multimedia content mapped to the first target object 104 (e.g., as a first level of filtering). In other words, the application server 106 may generate a query to determine an identifier that is associated with the first target object 104 based on the detection of the first target object 104 in the second digital media. Based on the query, the application server 106 may determine that the first identifier is associated with the mapping between the first target object 104 and the plurality of multimedia content.

The application server 106 may determine context features based the second digital media, the received sensor data, and the user profile of the second user. The context features may include one or more of demographics of the second user, a geo-location of the second user device, a current season, a current timestamp, identity variables of the second user, a travel history of the second user, event information associated with the second user, current affairs information, or the like. The application server 106 may determine any such context feature that may enable accurate determination of a context associated with the second digital media and/or the second user.

In an example, based on the sensor data, the application server 106 may determine a current location where the second user is and current environmental conditions at the location. Further, based on the user profile of the second user and the timestamp, the application server 106 may determine any event (e.g., birthday, anniversary new year, Christmas, or the like) associated with the second user.

In another example, by processing the sensor data (e.g., sensor data of built-in accelerometers, gyroscope, or the like in the second user device), the application server 106 may determine whether the second user is walking or running at a specific time of day when the first content viewing request was communicated. Here, the activity information determined by the application server 106 may correspond to a context feature. Further, the application server 106 may correlate the sensor data of multiple sensors to derive more accurate context features. For example, by correlating the activity knowledge with GPS sensor data, the application server 106 may determine the location where the second user was performing the activity, and derive a context feature whether the user is running as a leisure activity and wants augmented reality presentation for entertainment or running to catch a bus and wants augmented reality presentation for route guidance. The abovementioned examples of context features should not be construed to limit the scope of the disclosure. The application server 106 may use multiple context recognition algorithms to derive the context features of the second digital media and the second user. The application server 106 may the compute a context vector representing a context associated with the received second digital media and the second user based on a correlation of the determined context features. The context vector here represents the context of the second digital media and the second user as an 'n' dimensional numerical array.

The application server 106 may then compare the computed context vector with the plurality of context vectors of the plurality of multimedia for a second level of filtering. The comparison of the computed context vector with the plurality of context vectors of the plurality of multimedia may include implementation of the various data comparison algorithms, for example, approximate nearest neighbor algorithm, cosine similarity algorithm, or the like.

In an embodiment, prior to comparing the computed context vector with the plurality of context vectors of the plurality of multimedia, the application server 106 may be configured to segregate the plurality of multimedia content into one or more clusters depending upon similarity among the plurality of multimedia content. In such an embodiment, the application server 106 may only compare the computed context vector with the context vectors of one of the clusters of multimedia content, instead of all the context vectors. Thus, reducing computational complexity of the application server 106. The application server 106 may optionally implement sorting and indexing algorithms to arrange the compared plurality of multimedia in an order, for example, an order of increasing similarity or in an order of decreasing similarity.

The application server 106 may then select at least one of the plurality of multimedia content for which contextual relevance with the first target object 104 or the second user of the second mobile device exceeds a threshold value (for example, 20%, 50%, 60%, 80%, or the like). In other words, the application server 106 may select those multimedia content that best suit the context of the second user and/or the first target object 104. In an example, if the application server 106 determines that it is second user's birthday today and the first target object 104 is gift box, the application server 106 may select the first multimedia content corresponding to a birthday celebration. In another example, the first target object 104 may be a greeting card. Thus, when the second user scans the first printed image card on $1^{st}$ January, the application server 106 selects from the plurality of multimedia content, the second multimedia content associated with new year celebration due to high contextual relevance with $1^{st}$ January (e.g., New year day celebration).

In another example, if the application server 106 determines that the second user is on a holiday in Paris and is pointing the second user device towards the Eiffel tower at night for augmented reality presentation, the application server 106 may select a multimedia content portraying a starry night. In another scenario, if the application server 106 detects that the context is a sunny rainy day and the scanned first object is the Eiffel tower, the application server 106 may select a multimedia content portraying a rainbow.

The contextual relevance may be in terms of degree of similarity or degree of dissimilarity. Since different context features can be derived or determined for the first target object 104, the second digital media, and the second user under different user situations, the application server 106 may select different multimedia content at different times based on changing contextual relevance.

In a non-limiting example, it is assumed that the application server 106 selects the first multimedia content mapped to or associated with the first target object 104. Consequently, the application server 106 may communicate a first content viewing response to the second user device. The first content viewing response may include the first multimedia content mapped to the first target object 104. The first content viewing response may further include or be indicative of the first trigger action. Therefore, the first multimedia content is retrieved from the application server 106 based on scanning of the first printed image card by the second user. In an embodiment, the first multimedia content is downloaded on the second user device. In another embodiment, the application server 106 may stream the first multimedia content for playback on the second user device.

For the sake of brevity, it is assumed that the first multimedia content is the first video. Based on the received content viewing response, the service application 112 may playback the first multimedia content on the display of the second user device, thus displaying the first video on the second user device as long as the second user device is pointed towards the first printed image card. The first video that is displayed may appear to be superimposed on the first target object 104 being displayed in the second digital media. In other words, when the first printed image card is viewed through the camera in the second user device, the first target object 104 which is the first printed image card may appear to have been replaced by the first video. The first video may be multi-dimensional (e.g., 2D or 3D). In other words, the application server 106, via the service application 112, renders an augmented reality presentation in which the selected first multimedia content is superimposed on the first target object 104.

The application server 106 may further trigger the streaming of the special effects (e.g., the third multimedia content) to the second user device based on an occurrence of the first trigger action in the first video. Examples of the first trigger action may include various gesture or actions such as, but not limited to, clapping of hands, snapping of fingers, winking, performing specific dance moves, saying specific trigger words, opening of the box, or the like. In a non-limiting example, it is assumed that the first trigger action corresponds to opening of the gift box in the first video.

When the first trigger action occurs (e.g., when the gift box is opened) during the playback of the first video, the service application 112 under the control of the application server 106 renders the special effects on the second user device. To render the special effects, the service application 112, under the control of the application server 106, superimposes the special effects on the first target object 104 concurrently with the first video (e.g., the first multimedia content).

For the sake of brevity, it is assumed that the user specifies a single trigger action (e.g., the first trigger action) for the first video. However, in an actual implementation, the first video may include multiple trigger actions without deviating from the scope of the disclosure. In such a scenario, same special effects (e.g., the first set of special effects) or different special effects may be rendered for each trigger action.

The special effects may include a set of augmented reality elements (e.g., the 2D emojis, the 3D emojis, the virtual flora, the virtual fauna, birthday cake with lighted candles, or the like). In one embodiment, the augmented reality elements may have a 3D or a four-dimensional (4D) effect. For example, the special effects may include a set of 3D emojis (e.g., smile emojis) that appear to emanate from the printed photo frame. Similarly, the special effects may include a set of virtual rocket-style fire crackers that appear to launch from the first printed image frame and burst at some distance away from the first printed image frame. Similarly, the special effects may include virtual fauna (e.g., butterflies) that appear to move out (e.g., fly out) of the first printed image card. Further, the virtual fauna may appear to move about in an immediate environment of the first printed image card. In other words, the set of augmented reality elements may be dynamic in nature, such that one or more augmented reality elements are associated with a corresponding movement trajectory. Each of the set of augmented reality elements may be a virtual object that occurs in a virtual space and can be viewed through the camera of user devices (e.g., the second user device).

The service application 112 may be further configured to enable users (e.g., the second user) to track, capture, interact, and/or manipulate the set of augmented reality elements. The service application 112 may be further configured to manipulate the set of augmented reality elements in accordance with environment inputs. In an embodiment, the service application 112 may detect and recognize one or more gestures of the second user, using front and/or back cameras of the second user device, and manipulate a multimedia content (e.g., the set of augmented reality elements) superimposed on the second digital media in accordance with the detected gesture to create a perception of the multimedia content being altered in response to the detected gesture. For example, the service application 112 may further provide one or more options to enable the second user to interact with the virtual butterfly (e.g., the set of augmented reality elements), allowing the second user to modify a color and a size of the virtual butterfly and/or elicit reactions from the virtual butterfly. In another example, the service application 112 may record a gesture (for example, touching the virtual butterfly) made by the second user while the camera is pointing to the first printed image card and transmit the camera feed including the second digital media and the gesture to the application server 106. In such a scenario, the application server 106 may manipulate the virtual butterfly superimposed on the first printed image card in accordance with the detected gesture. To manipulate the virtual butterfly, the application server 106 may elicit a reaction, to the touch of the second user, from the virtual butterfly. Such manipulation creates a perception of the multimedia content (e.g., the virtual butterfly) being altered in response to the detected gesture of the second user. Thus, creating an extended reality experience for the second user. In another embodiment, similar manipulation may be achieved in response to environmental inputs captured during the capturing the recording of the second digital media by the sensors of the second user device. For example, based on a bird chirping sound captured by an audio sensor of the second user device, the application server 106 may manipulate a virtual bird in the augmented realty presentation to create a perception as if the audio is uttered by the virtual bird. In other words, the application server 106 detects a trigger action based on the received digital media and the sensor data and manipulates the multimedia content superimposed on the first target object 104 in accordance with the trigger action to create a perception of the multimedia content being altered in response to the trigger action. Here, the trigger action is a gesture made by the second user and/or an environmental input recorded in either the second digital media or the sensor data.

In another embodiment, the service application 112 may include one or more options to enable the second user to capture a multimedia item (e.g., virtual butterfly flying out of the first printed image frame) by making a first gesture and place the captured multimedia item in another environment (e.g., on top of a bed in a bedroom of the second user) away from the first printed image frame by making a second gesture as a follow up to the first gesture. In such an embodiment, the application server 106 receives, from the second user device, a signal indicating that the first gesture is made by the second user on the multimedia item being displayed during the augmented reality presentation. Further, the application server 106 receives, from the second user device, another signal indicating that the second gesture is made by the second user as a follow-up to the first gesture. The other signal further includes a digital image frame of the other environment (e.g., on top of the bed in the bedroom of the second user) captured by the second user device at the time the second gesture was made by the second user. Based on the first and second signals the application server 106 may map the multimedia item with the image frame captured by the second user device at the time the second gesture was made by the second user and store the mapping between the multimedia item and the image frame in the database for subsequent augmented reality presentation. Thus, the virtual butterfly would now appear in the corresponding environment (e.g., on the bed in the bedroom of the second user) whenever the environment is scanned by the second user by way of the camera included in the second user device in future.

The rendering of the first video and the set of augmented reality elements enables the second user to experience the first multimedia content and the special effects in augmented reality, by way of the service application 112.

In some embodiments, the first user 108 may intend to selectively share the plurality of multimedia content and may specify one or more users (e.g., the second user) or user devices that are to be allowed to view the plurality of multimedia content. In one embodiment, the first multimedia content generation request may be indicative of details or identifiers of users (and/or user devices) that are to be given access to the plurality of multimedia content. In such a scenario, the application server 106 may, by way of the service application 112 that is executed on the second user device, prompt the second user to provide authentication information (e.g., username, password, security code, or the like) when the second user scans the first printed image card. The application server 106 authenticates the second user prior to rendering the augmented reality presentation based on the authentication information received from the second user device. In such a scenario, the content viewing response may be communicated to the second user device only after the authentication information provided by the second user is validated by the application server 106. The second user may not be able to view the plurality of multimedia content unless the authentication information provided by the second user is validated. Examples of the authentication information may include one or more of a faceprint of the user, fingerprints of the user, iris scan of the user, retina scan of the user, a voiceprint of the user, a facial expression code, a secret code, a secret phrase, a public key, and an account identifier-password pair. This enables content to be securely shared within closed groups (e.g., friend circles, family circles, organizations, or the like). Other security methods for sharing content within closed groups may be implemented without deviating from the scope of the disclosure.

In another embodiment, the first target object 104 when captured may include a unique identification code (e.g., a barcode, a QR code, a pattern code, an alphanumeric code, or the like). In other words, an identification code that uniquely identifies the first target object 104 captured by first user device 102 be embedded in the first digital media. The first digital media that is shared with the second user (e.g., the second user device) and the first content viewing request may also include the identification code. This may enable the application server 106 to uniquely identify multimedia content that is to be shared with the second user in a case where multiple users (e.g., the first user 108, a third user, a fourth user, and the like) have created content associated with similar objects. Based on the identification code that is included in the first content viewing request, the application server 106 may determine that the first multimedia content viewing response is to include one or more of the plurality multimedia content selected by the first user 108.

In another embodiment, the second user may be able to modify the plurality multimedia content created by the first user 108. For example, the second user may, by way of the GUI rendered by the service application 112, add a new set of special effects (e.g., a second set of special effects) and/or replace the first multimedia content with another multimedia content (e.g., replace the first video with a third video). A second multimedia content generation request may be generated, based on the new set of special effects and/or the other multimedia content. In such a scenario, based on the second multimedia content generation request, the application server 106 may map the first target object 104 to the other multimedia content selected by the second user. Therefore, when the first digital media is shared by the second user device with a third user device of a third user and the third user device scans the first printed image card, the other multimedia content may be rendered on a display of the third user device.

It is not necessary for users to always share generated content. For example, in another embodiment, the first user 108 may view the first multimedia content by scanning the first image by way of the first user device 102.

In another embodiment, the first multimedia content may include content that adds depth to the first target object 104 on the first printed image card. The service application 112 may be configured to detect objects in a foreground and a background of the second digital media and add depth to the first target object 104. For example, if the second digital media displayed the Eiffel tower and a surrounding environment of the Eiffel Tower, the first multimedia content that is rendered in augmented reality on the second user device may be a 3D image of the Eiffel Tower and the surrounding environment.

In another embodiment, it may not be necessary for a user (e.g., the second user) to print the first digital media. A set of objects or a surrounding that resembles a set of objects or environment in the first digital media may be sufficient to view the plurality of multimedia content mapped to the first digital media. For example, if the first digital media displays the Eiffel Tower, the first multimedia content may be rendered or displayed on the display of the second user device if the second user device is directed towards (e.g., pointed towards) the actual Eiffel Tower or a model of the Eiffel Tower.

In an embodiment, the application server 106 may be configured to stream the selected multimedia content when digital media including the first target object 104 is synchronously received from two or more user devices. Thus, enabling collaboration among users to view augmented reality presentation on their devices. In such an embodiment, one of the user devices may function as a master device that is responsible for all trigger inputs and the other devices may function as slave devices.

In another embodiment, during augmented reality presentation, the application server 106 may be configured to further augmented the first target object 104 by embedding certain interactive elements (e.g., 2D icons, 3D icons, buttons, etc.) pertaining to current affairs, events determined or extracted from the Internet, news portals, or publicly available information.

In an embodiment, where the second digital media is a video instead of an image, the application server 106 may be configured to compute context vectors of a group of image frames in the video. Thus, image frames groups that differ in context have different multimedia content being superimposed thereon. For example, the video may be divided into groups having 'x' frames each, and the application server 106 may probe at fixed or variable time intervals to select contextually relevant multimedia content for each group of frames.

In another embodiment, the first printed image card may have a machine readable code printed thereon, such that when the second user scans the first image card for augmented reality presentation, the application server 106 live casts and/or broadcasts the augmented reality presentation on the second user device to one or more social media platforms linked to the machine readable code. In other words, the machine readable code functions as machine readable instructions to live cast and/or broadcast the augmented reality presentation on the second user device to selected social media platforms.

In an embodiment, if the application server 106 selects more than one multimedia content to be contextually relevant for augmented reality presentation, the application server 106 may provide an option via the service application 112 to the second user to select content of user's choice for presentation. Further, the application server 106 may provide an option to dynamically switch from playback of one selected content to playback of another selected content by gesture control or sensor control.

Figure 1B:
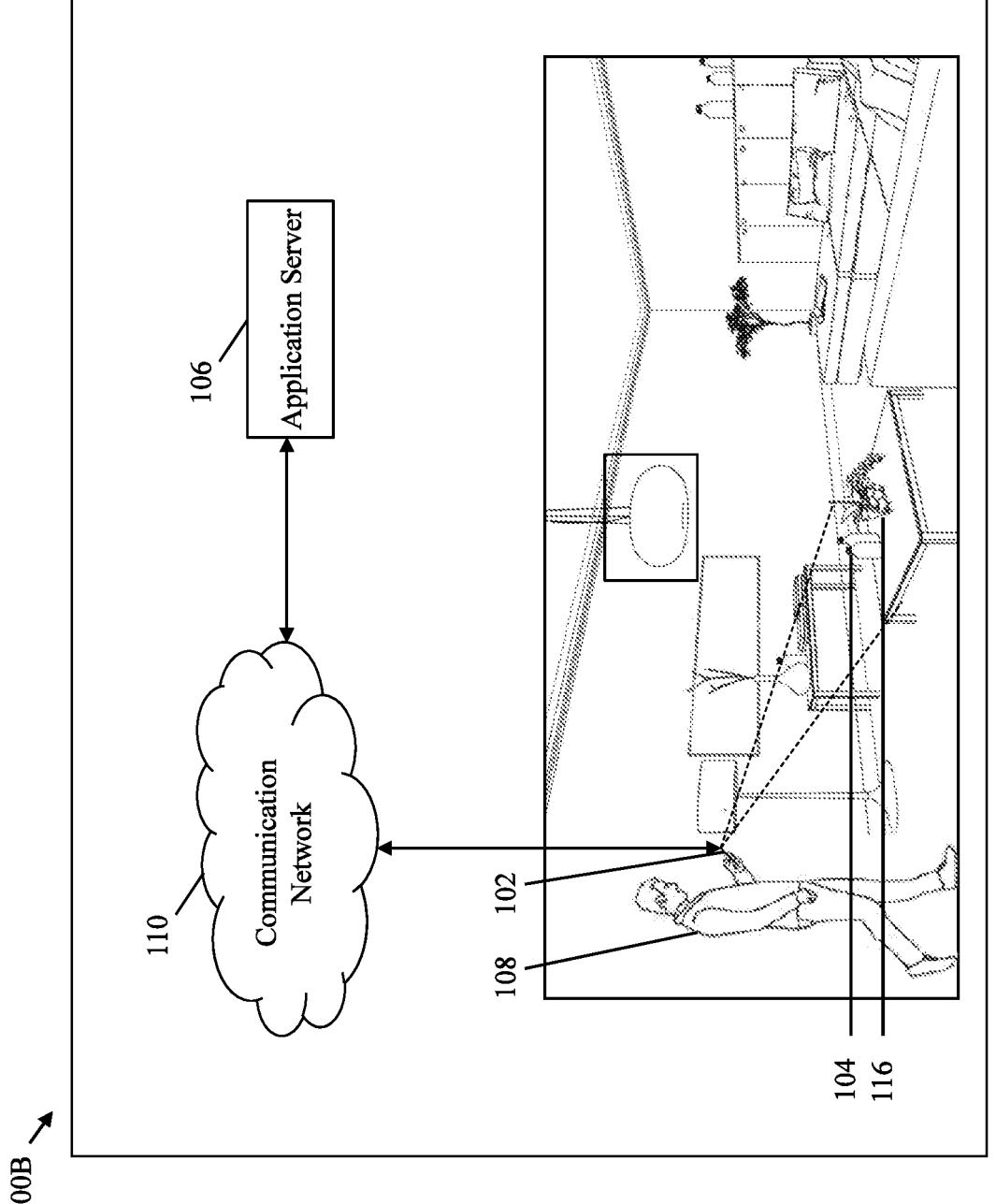
FIG. 1B is a block diagram that illustrates another system environment for presenting hyper-personalized augmented objects, in accordance with an exemplary embodiment of the present disclosure.

FIG. 1B is a block diagram that illustrates another system environment for presenting hyper-personalized augmented objects, in accordance with an exemplary embodiment of the present disclosure. Referring now to FIG. 1B, the environment 100B includes the first user device 102, the application server 106, the first user 108, the communication network 110, the first target object 104, and a second object 116.

The first user 108 directs the camera of the first user device 102 at the first target object 104 and the second object 116, in the surrounding scene. In such a scenario, the scanned image or video of the first target object 104 and the second object 116 corresponds to the first digital media. The first user 108 may execute similar operations as described in the foregoing description of FIG. 1A to map the first target object 104 and the second object 116 with the plurality of multimedia content.

In a scenario, where multiple objects are included in a digital media, the application server 106 may render different multimedia content during augmented reality presentation in accordance with which object is currently included in the second digital media being captured by the second user device. For example, the first multimedia content may be superimposed on the first target object 104, when the second digital media displays the first target object 104. However, the second user may change the direction in which the camera is pointing and the second object 116 may now be visible in the second digital media rendered on the display of the second user device. In such a scenario, the application server 106 may identify the second object 116 in the second digital media based on real-time or near real time streaming of the second digital media from the second user device to the application server 106 and the service application 112. Based on the inclusion the second object 116 in the second digital media, the application server 106 may select another multimedia content of the plurality of multimedia content and may start streaming the new multimedia content to the second user device. In response, the service application 112 may update, on the display of the second user device, the augmented reality presentation to superimpose the selected other multimedia content on the second object 116. However, in a scenario, if the second object 116 and the first target object 104 both are included in the second digital media, the application server 106 may stream multiple multimedia content selected for superimposing on each of the first target object 104 and the second object 116 to the second user device. In such a scenario, the service application 112 may superimpose the other multimedia content on the second object 116 (e.g., second target object) concurrently with the multimedia content being superimposed on the first target object 104. Thus, the service application 112 may create different augmented reality presentation as the camera points to different surroundings.

Figure 2:
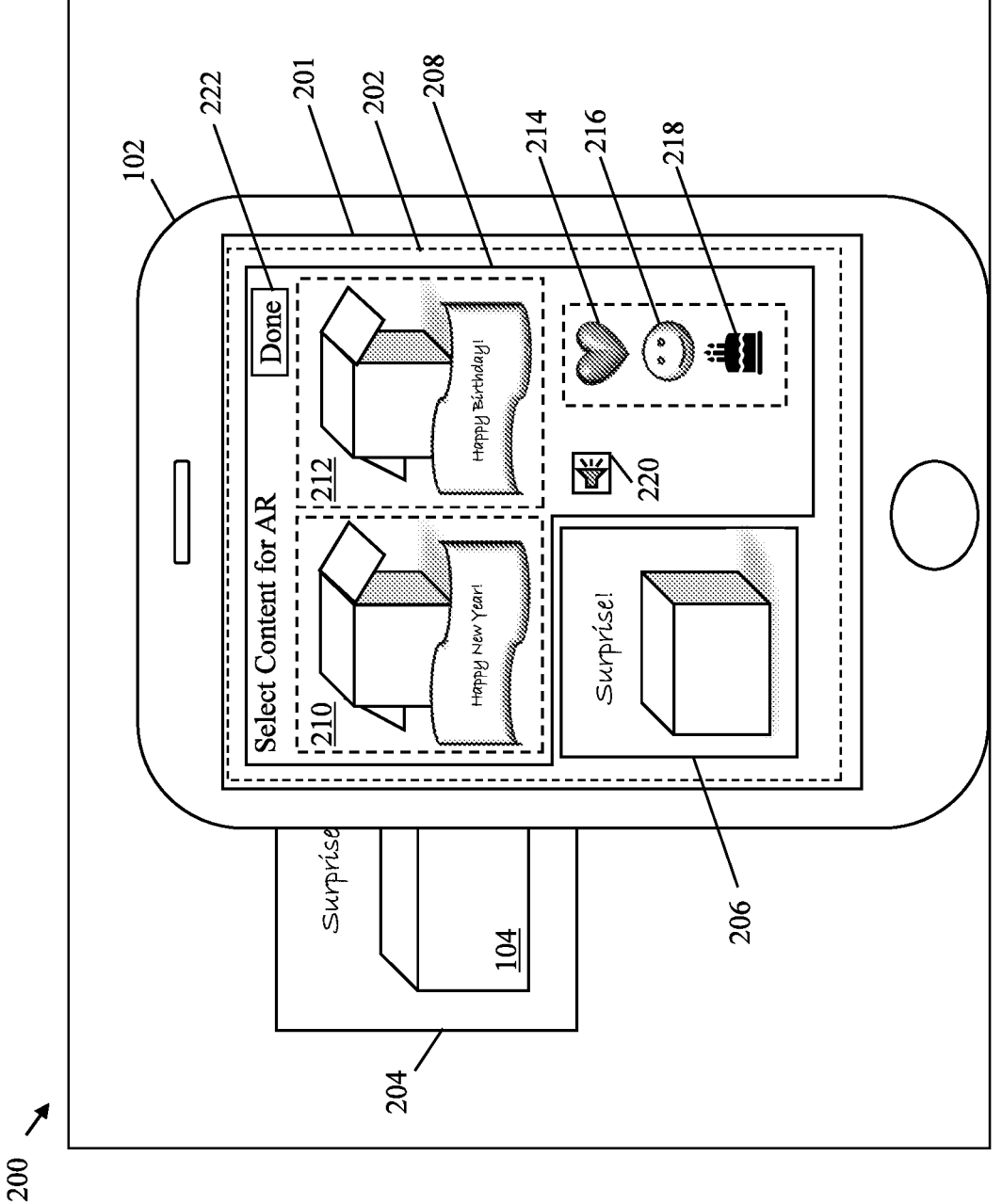
FIG. 2 is a diagram that illustrates an interactive GUI rendered on a display of a mobile device, in accordance with an exemplary embodiment of the present disclosure.

FIG. 2 is a diagram 200 that illustrates an interactive GUI rendered on a display of a mobile device, in accordance with an exemplary embodiment of the present disclosure. The first user device 102 may be utilized by the first user 108 (shown in FIGS. 1A and 1B) to open the service application 112 on the first user device 102. In an example, the first user 108 may open the service application 112 on the first user device 102 in the creator mode. When the service application 112 is opened, the application server 106 renders, on the display 201 of the first user device 102, an interactive GUI 202 to enable the first user 108 to create content for augmented reality presentation. The service application 112 gains access to the camera of the first user device 102. In a non-limiting example, it is assumed that the first user 108 points the camera towards a printed image 204 that has the first target object 104, for example, an unwrapped gift box, printed thereon. The first digital media (hereinafter, referred to and designated as "the first digital media 206") is then captured by using the camera of the first user device 102. For example, the first user 108 may click a digital image or record a video of the printed image 204 using the camera.

The interactive GUI 202 displays the captured first digital media 206 on the display 201. The interactive GUI 202 further displays a "select content for AR" section 208 which presents a plurality of multimedia content options to the first user 108 for mapping with the first target object 104 included in the first digital media 206. In a non-limiting example, the "select content for AR" section 208 is shown to present a first multimedia content 210, a second multimedia content 212, a third multimedia content 214, a fourth multimedia content 216, a fifth multimedia content 218, and a sixth multimedia content 220 options to the first user 108. The multimedia content presented as options may be retrieved by the service application 112 from a memory of the first user device 102, downloaded from Internet, default options of the service application 112, or the like. The first multimedia content 210 and the second multimedia content 212 are two videos that vary in context, for example, 'Happy New Year" and "Happy Birthday" video messages. The third multimedia content 214, the fourth multimedia content 216, and the fifth multimedia content 218 are special effects, for example, emoticons of a heart, a smiling face, and a candle lit cake, respectively. The sixth multimedia content 220 is a happy new year song.

The interactive GUI 202 can be manipulated by the first user 108 to select multimedia content for mapping with the first target object 104 for augmented reality presentation. In a non-limiting example, it is assumed that the first user 108 manipulates the interactive GUI 202 to select the first multimedia content 210, the second multimedia content 212, the third multimedia content 214, the fourth multimedia content 216, the fifth multimedia content 218, and the sixth multimedia content 220 for mapping with the first target object 104. The first user 108 may further define "opening of the gift box" as a trigger action for triggering the presentation of the third multimedia content 214, the fourth multimedia content 216, and the fifth multimedia content 218. "Opening of the gift box" is an action that appears in the first multimedia content 210 and the second multimedia content 212. The interactive GUI 202 further displays an "Done" option 222 to indicate completion of the content creation operation. When the "Done" option 222 is selected, the service application 112 communicates a signal to the application server 106 as a content generation request. The signal indicates that the first target object 104 is mapped to the plurality of multimedia content 210-220 by manipulating the interactive GUI 202 at the first user device 102. As descried in the foregoing, the application server 106 may store the mapping between the plurality of multimedia content 210-220 and the first target object 104 in the database. The application server 106 further determines or generates context vectors for the plurality of multimedia content 210-220.

Figure 3A:
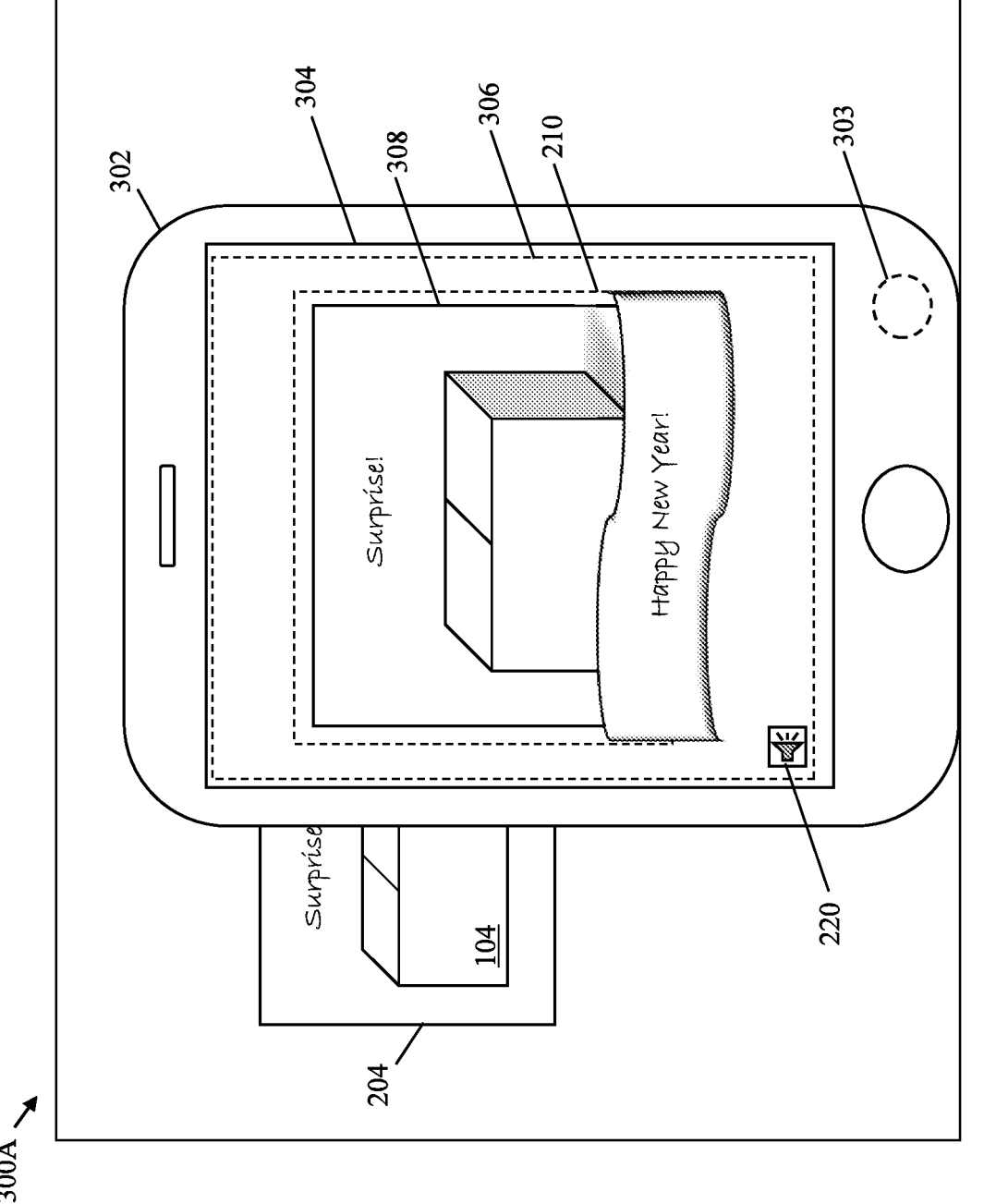
FIGS. 3A and 3B are diagrams that collectively illustrate exemplary scenarios for presenting hyper-personalized augmented objects on a mobile device, in accordance with an exemplary embodiment of the present disclosure.
Figure 3B:
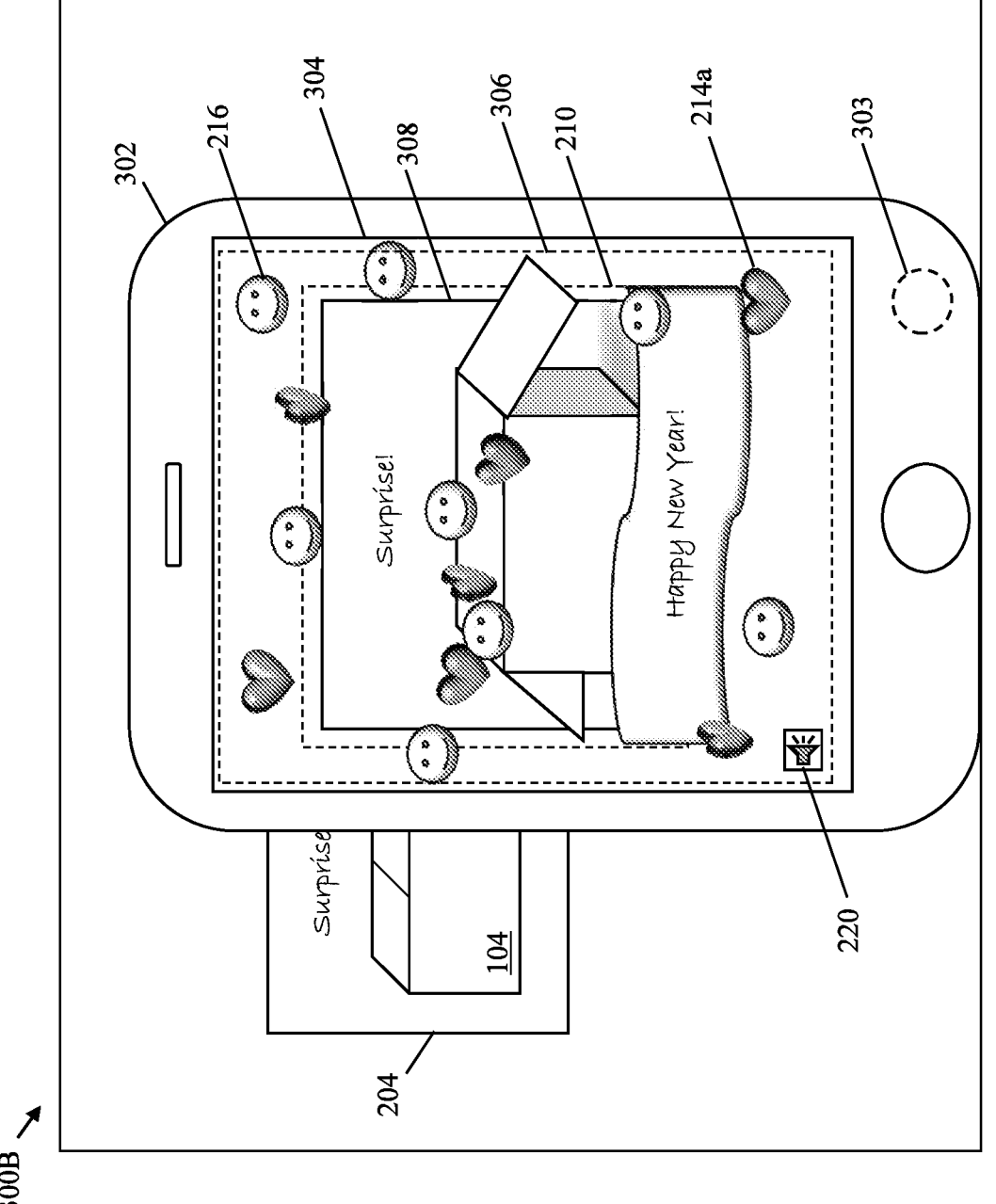

FIGS. 3A and 3B are diagrams that collectively illustrate exemplary scenarios 300A and 300B for presenting hyper-personalized augmented objects on a mobile device, in accordance with an exemplary embodiment of the present disclosure. Referring now to FIG. 3A, the second user device (hereinafter referred to and designated as "the second user device 302") may be utilized by the second user to open the service application 112 on the second user device 302. In an example, the second user may open the service application 112 on the second user device 302 in the viewer mode. The service application 112 opened in viewer mode gains access to one or more sensors 303 of the second user device 302. When the service application 112 is opened, the application server 106 renders, on the display 304 of the second user device 302, an interactive GUI 306 to enable the second user to view augmented reality presentation associated with the printed image 204 including the first target object 104. To view the augmented reality presentation, the second user points the camera of the second user device 302 towards the printed image 204 that has the first target object 104, for example, the unwrapped gift box, printed thereon. The second digital media (hereinafter, referred to and designated as "the second digital media 308") is then captured by the camera of the second user device 302. For example, the second user may click a digital image or record a video of the printed image 204 using the camera.

The service application 112 then communicates the first multimedia content viewing request to the application server 106. The first multimedia content viewing request includes the second digital media 308 being captured by the second user device 302 in real time or near real time. The application server 106 processes the second digital media 308 to detect the first target object 104. The application server 106 then searches the database to retrieve any multimedia content mapped to the first target object 104. The application server 106 further processes data included in the first content viewing request to derive the context features of the second digital media 308 and the second user. In a non-limiting example, the application server 106 determines that the first target object 104 is an unwrapped giftbox and the printed image 204 is scanned on 1$^{st}$ January. Thus, the application server 106 selects the first and sixth multimedia content 210 and 220 mapped to the first target object 104 and streams the first multimedia content 210 to the second user device 302 for augmented reality presentation. The application server 106 selects the first and sixth multimedia content 210 and 220 as the contextual relevance between the first and sixth multimedia content 210 and 220 and the first target object 104 or the second user exceeds a threshold value.

As shown in FIG. 3A, the display 304 displays the first multimedia content 210 being overlaid (e.g., superimposed) on the first target object 104 and plays the audio of the sixth multimedia content 220.

In an embodiment, the first multimedia content 210 may be transformed by the application server 106 in accordance with at least one of the shape, the size, and the surface curvature of the first target object 104, prior to the superimposition on the first target object 104. Such transformation enables the application server 106 to create more realistic augmented reality experience for the second user. For example, if the surface of the first target object 104 was curved, the first multimedia content 210 may be transformed. As a result of transformation, the transformed first multimedia content 210 fits the curved surface of the first target object 104 accurately. For different object types, the application server 106 may perform different transformation.

Referring now to FIG. 3B, during the playback of the first multimedia content 210, the application server 106 detects the occurrence of the trigger action (e.g., opening of the gift box) defined for the first multimedia content 210. In response, the application server 106 streams the third and fourth multimedia content 214 and 216 to the second user device 302. Thus, the application server 106, via the service application 112, renders a video of opening the cardboard box and further superimposed with the smiling and heart emoticons (e.g., the third and fourth multimedia content 214 and 216), which appear to emanate from or come out of the opened cardboard box.

The second user may then make a first gesture as an attempt to hold a multimedia item (e.g., a heart emoticon) and then as a follow up make a second gesture as an attempt to place the captured multimedia item in another environment (e.g., on top of a bed in a bedroom of the second user) away from the printed image frame. The first and second gestures may be captured by the service application 112 using the front and/or back cameras of the second user device 302. In response, the application server 106 receives from the second user device 302, the signals indicating that the first gesture is made by the second user on a heart emoticon 214a (e.g., a multimedia item) and that the second gesture is made by the second user as a follow-up to the first gesture to place the heart emoticon 214a in the other environment. The signals further include a digital image frame of the other environment (e.g., on top of the bed in the bedroom of the second user) and global positioning system (GPS) coordinates of the location of the other environment. The application server 106 thus maps the heart emoticon 214a with the image frame and location of the top of the bed in the bedroom and stores the mapping in the database for subsequent augmented reality presentation. Thus, the heart emoticon 214a would now appear on top of the bed in the bedroom whenever the environment is scanned by the second user by way of a camera.

Figure 4A:
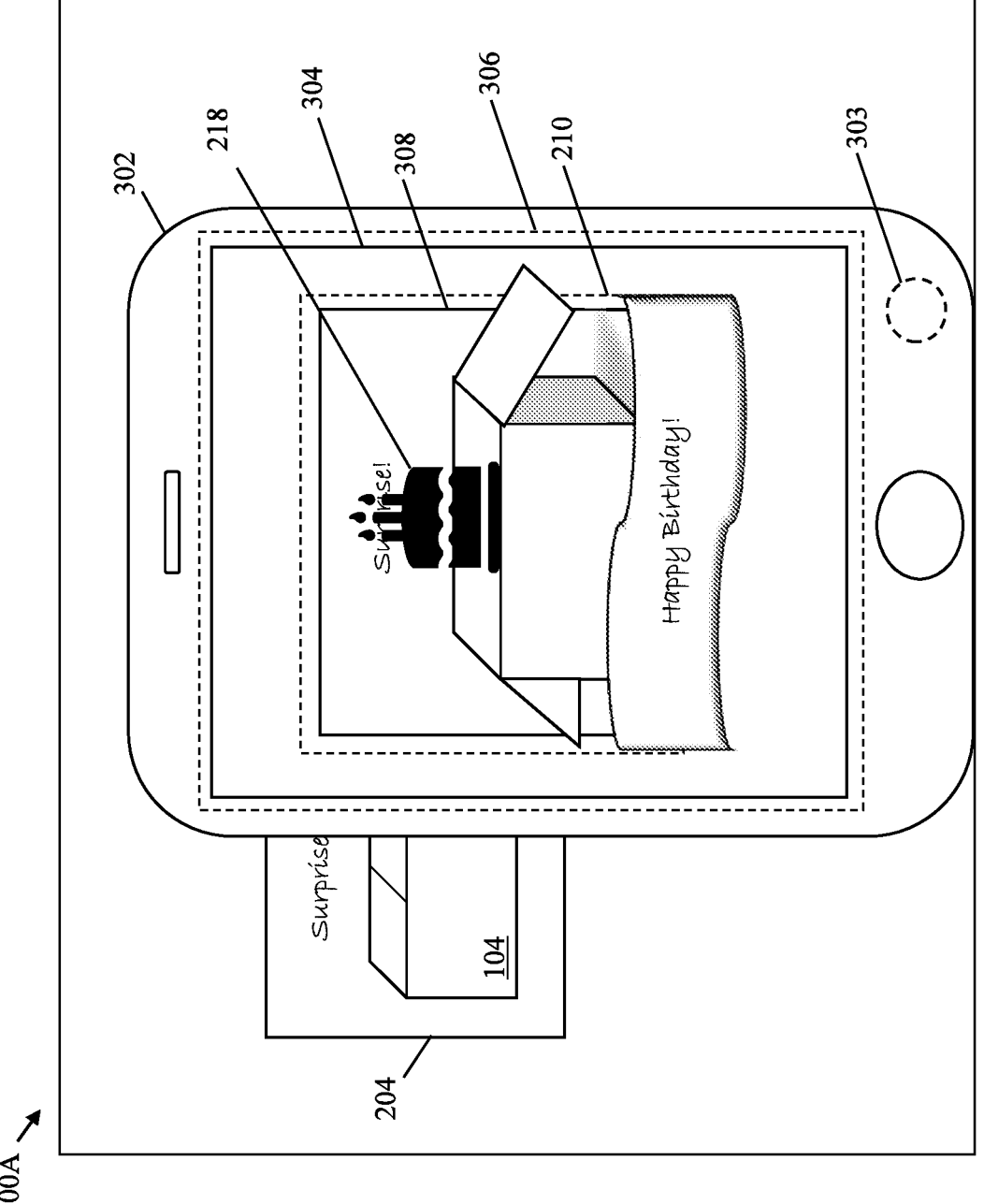
FIGS. 4A and 4B are diagrams that collectively illustrate exemplary scenarios for presenting hyper-personalized augmented objects on a mobile device, in accordance with an exemplary embodiment of the present disclosure.
Figure 4B:
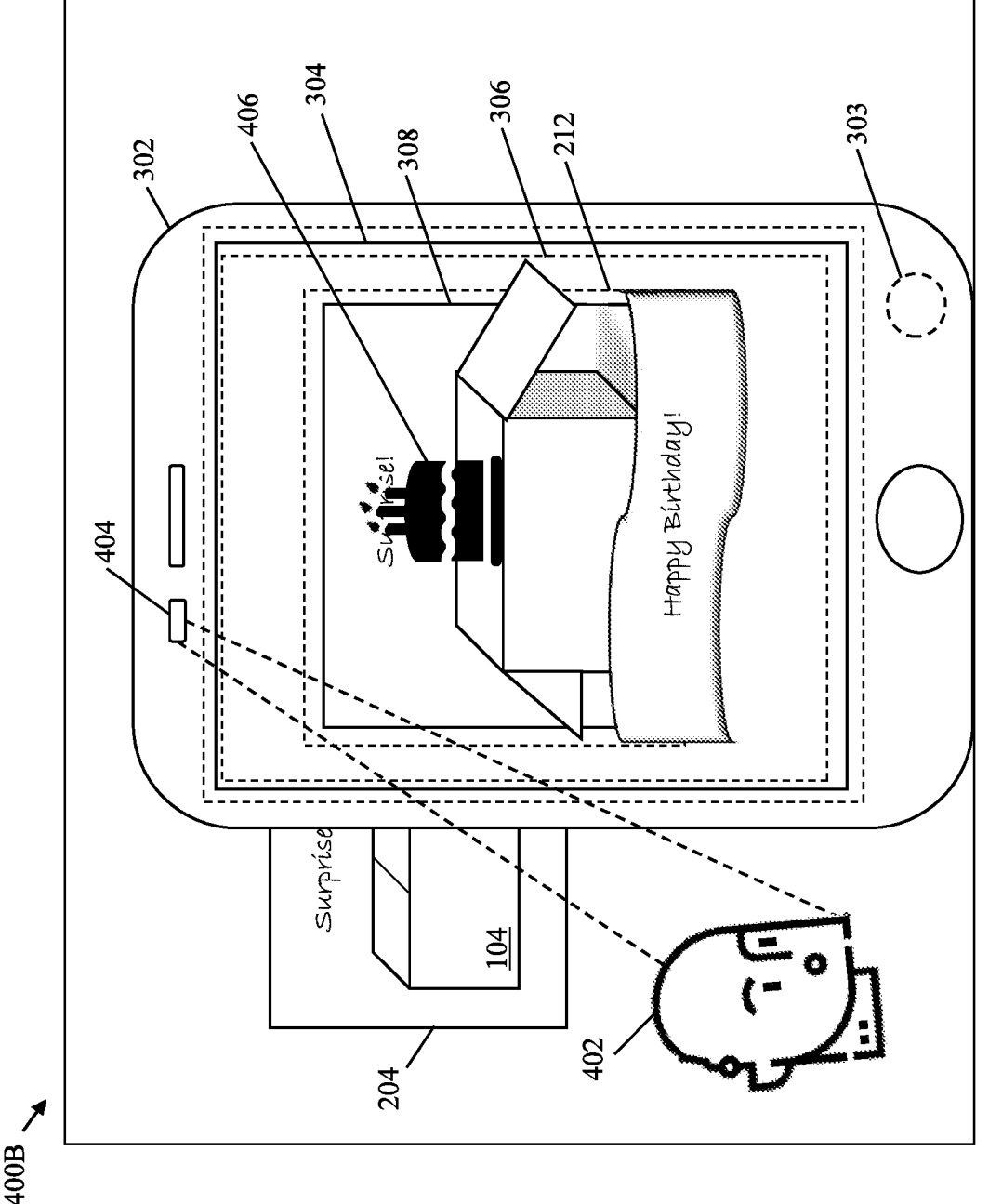

FIGS. 4A and 4B are diagrams that collectively illustrate exemplary scenarios 400A and 400B for presenting hyper-personalized augmented objects on a mobile device, in accordance with an exemplary embodiment of the present disclosure. Referring now to FIG. 4A, the display 304 displays the second multimedia content 212 being overlaid (e.g., superimposed) on the first target object 104 as the contextual relevance between the second multimedia content 212 and the first target object 104 or the second user exceeds the threshold value. The display 304 further displays the fifth multimedia content 218 being overlaid (e.g., superimposed) on the first target object 104 along with the second multimedia content 212 due to detection of occurrence of the trigger action (e.g., opening of the gift box) in the second multimedia content 212.

Referring now to FIG. 4B, the second user (referred to and designated as "the second user 402) may make a gesture (e.g., wind blowing gesture from mouth) as an attempt to blow the lighted candles. The gesture may be captured by the service application 112 using the front camera 404 of the second user device 302. In response, the application server 106 receives from the second user device 302, a signal indicating that the wind blowing gesture is made by the second user 402. Based on the signal, the service application 112 manipulates the fifth multimedia content 218 to content 406 superimposed on the first target object 104 in accordance with the detected gesture. As shown in FIG. 4B, the flames of the candles in the superimposed content 406 are shown to be manipulated as if someone blew the candles. As a result, a perception of blowing the candles by the gesture is created for the second user 402. In an embodiment, the service application 112 may manipulate the fifth multimedia content 218 to the content 406 in accordance with the detected gesture after a time delay, for example, after 2 second, 5 seconds, 10 seconds, or the like. An amount of time delay may be derived based on a perceived distance between objects in the multimedia content and the second user 402 to create more realistic and natural effect.

Figure 5:
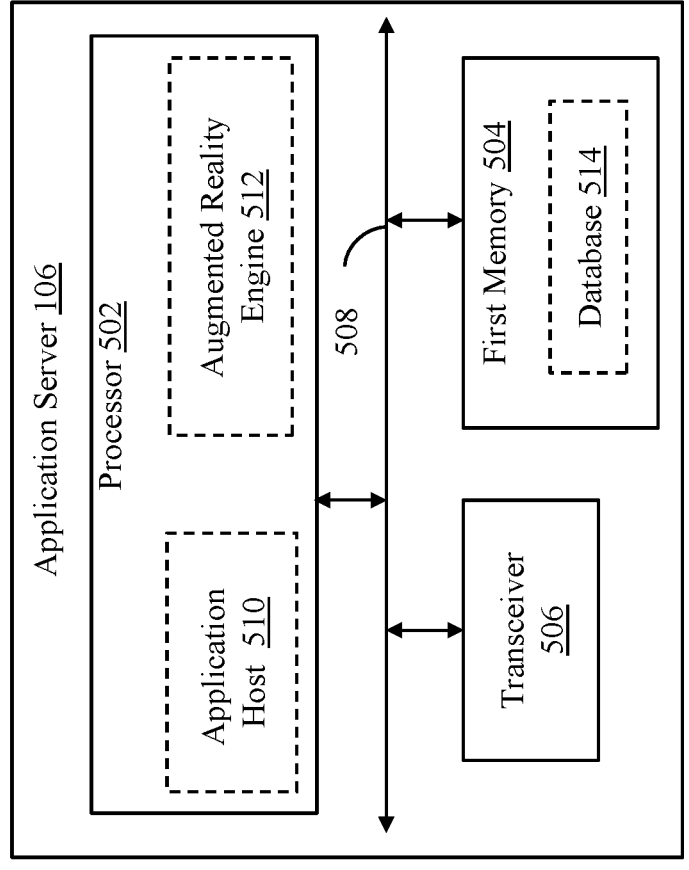
FIG. 5 is a block diagram that illustrates a system for presenting hyper-personalized augmented objects, in accordance with an exemplary embodiment of the disclosure.

FIG. 5 is a block diagram that illustrates a system for presenting hyper-personalized augmented objects, in accordance with an exemplary embodiment of the disclosure. The system for presenting hyper-personalized augmented objects includes the application server 106. The application server 106 may include a processor 502, a memory 504, and a transceiver 506. The processor 502, the memory 504, and the transceiver 506 communicate with each other by way of a communication bus 508. The processor 502 may include an application host 510 and an augmented reality engine 512.

The processor 502 may include suitable logic, circuitry, interfaces, and/or code, executable by the circuitry that may be configured to execute the instructions stored in the memory 504 to perform various operations to facilitate implementation and operation of the augmented reality system. The processor 502 may perform various operations that enables users to create, view, share, and modify content (e.g., augmented reality content). Examples of the processor 502 may include, but are not limited to, an application-specific integrated circuit (ASIC) processor, a reduced instruction set computer (RISC) processor, a complex instruction set computer (CISC) processor, a field programmable gate array (FPGA), and the like. The processor 502 may execute various operations for facilitating augmented reality (AR) presentation by way of the application host 510 and the augmented reality engine 512.

The memory 504 may include suitable logic, circuitry, interfaces, and/or code, executable by the circuitry, to store information required for creating, rendering, and sharing augmented reality content, e.g., multimedia content as described in the foregoing description of FIGS. 1A-4B. The memory 504 may include the database (hereinafter, designated and referred to as "the database 514") that stores information (e.g., multimedia content, digital media, identifiers, content, special effects, trigger moments, trigger actions, context labels or the like) associated with each content generation request. For example, the database 514 in the memory 504 stores the mapping between the plurality of multimedia content 210-220 and the first target object 104. The database 514 may further store the context vectors in the memory 504 for the plurality of multimedia content 210-220. Information or data stored in the database 514 has been described in the foregoing description of FIGS. 1A, 1B, 2, 3A, 3B, 4A, and 4B.

Examples of the memory 504 may include a random-access memory (RAM), a read-only memory (ROM), a removable storage drive, a hard disk drive (HDD), a flash memory, a solid-state memory, or the like. It will be apparent to a person skilled in the art that the scope of the disclosure is not limited to realizing the memory 504 in the application server 106, as described herein. In another embodiment, the memory 504 may be realized in form of a database server or a cloud storage working in conjunction with the application server 106, without departing from the scope of the disclosure.

The application host 510 may host the service application 112 that enables users (e.g., the first user 108 and the second user) to create, view, share, and modify augmented reality content. The application host 510 is configured to render the GUI 202 or 306 of the service application 112 on user devices (e.g., the first user device 102 and the second user device 302). Further, the application host 510 is configured to communicate requests (e.g., the first content generation request and the first content viewing request) to the application server 106 and receive responses (e.g., the first content viewing response) from the application server 106. The application host 510 may be configured to control the operations of the service application 112. In other words, operations performed by the service application 112 on the first and second user devices 102 and 302 may be under the control of the application server 106. The application host 510 may be configured to control, via the transceiver 506, streaming of multimedia content on user devices for augmented reality presentation.

The augmented reality engine 512 may be configured to generate augmented reality content (e.g., superimposing multimedia content on digital media displayed on mobile devices), based on received content generation requests (e.g., the first content generation request). The augmented reality engine 512 may be further configured to detect or recognize trigger actions, based on which the service application 112 renders special effects (e.g., the first set of special effects). The augmented reality engine 512 may be further configured to perform extended object tracking to dynamically track objects or augmented reality elements (e.g., the first augmented reality element) that are captured by users (e.g., the second user). The augmented reality engine 512 may be further configured to implement extended reality by manipulating augmented reality elements in response to user gestures or environment inputs as descried in the foregoing description of FIG. 1A and FIG. 4B.

The transceiver 506 may include suitable logic, circuitry, interfaces, and/or code, executable by the circuitry, to transmit and receive data over the communication network 110 using one or more communication network protocols. The transceiver 506 may transmit requests and messages to and receive requests and messages from user devices (e.g., the first user device 102, the second user device 302, or the like). Examples of the transceiver 506 may include, but are not limited to, an antenna, a radio frequency transceiver, a wireless transceiver, a Bluetooth transceiver, an ethernet port, a universal serial bus (USB) port, or any other device configured to transmit and receive data.

It will be apparent to a person of ordinary skill in the art that various operations performed by the application server 106 would be enabled by the circuitry of the application server 106 including the processor 502, the memory 504, the transceiver 506, the communication bus 508, the application host 510, and the augmented reality engine 512.

Figure 6:
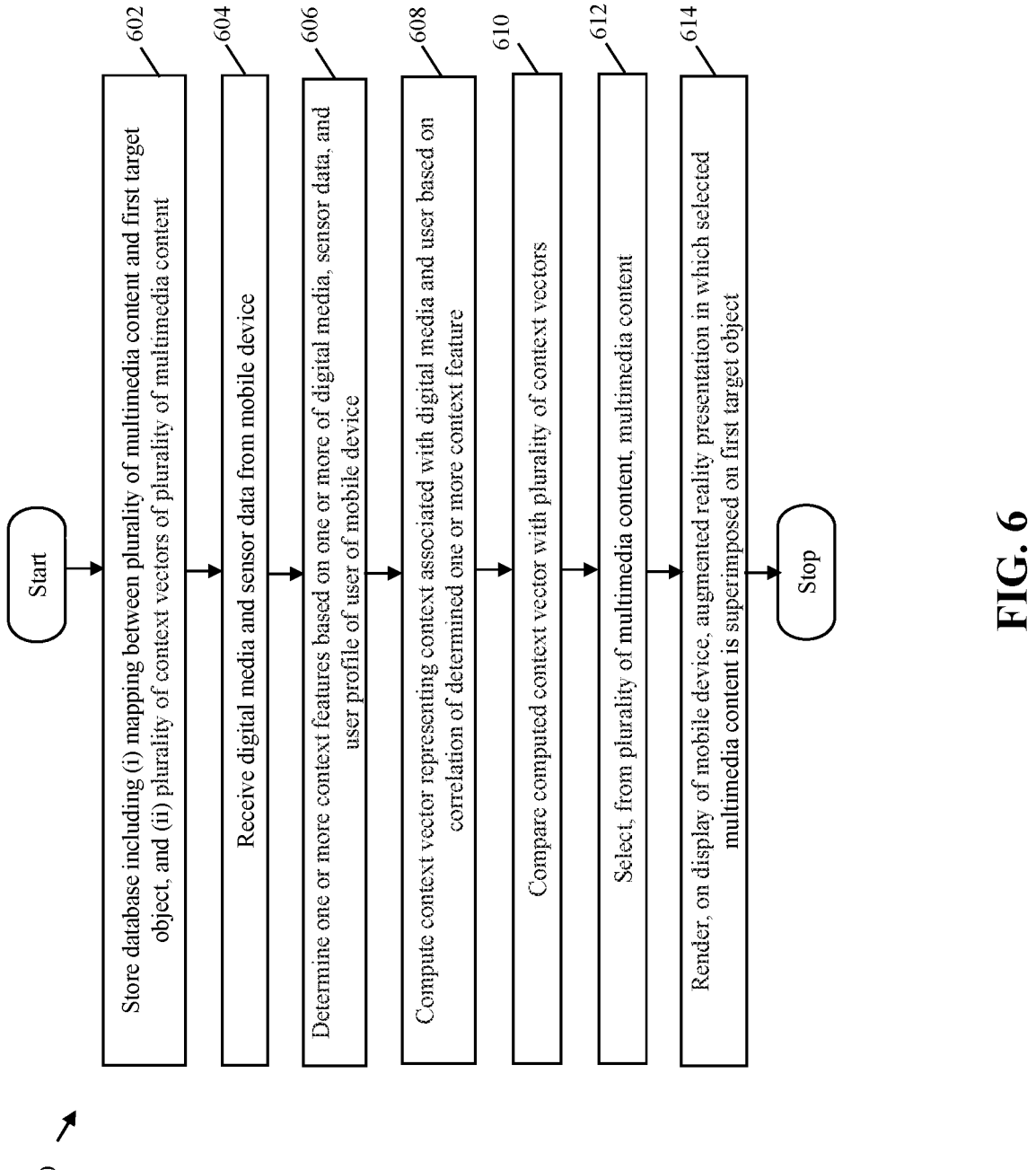
FIG. 6 is a flow chart that illustrates a method for presenting hyper-personalized augmented objects, in accordance with an exemplary embodiment of the disclosure.

FIG. 6 is a flow chart that illustrates a method 600 for presenting hyper-personalized augmented objects, in accordance with an exemplary embodiment of the disclosure.

At 602, a database including (i) the mapping between the plurality of multimedia content 210-220 and the first target object 104 and (ii) the plurality of context vectors of the plurality of multimedia content 210-220 is stored. The application server 106 (e.g., a system) stores, in the memory 504, the database 514 including (i) the mapping between the plurality of multimedia content 210-220 and the first target object 104 and (ii) the plurality of context vectors of the plurality of multimedia content 210-220 as described in the foregoing description of FIGS. 1A-1B, 2, 3A-3B, 4A-4B, and 5. Each of the plurality of context vectors corresponds to a numerical representation of a context of a corresponding multimedia content of the plurality of multimedia content 210-220.

At 604, a digital media (e.g., the second digital media 308) being captured by one or more imaging devices associated with a mobile device (e.g., the second user device 302) and the sensor data generated by the sensors of the second user device 302 are received. The second digital media 308 displays the first target object 104. The transceiver 506 receives the second digital media 308 and the sensor data from the second user device 302 as described in the foregoing description of FIGS. 1A-1B, 2, 3A-3B, 4A-4B, and 5.

At 606, one or more context features are determined based on one or more of the received second digital media 308, the received sensor data, and the user profile of the user of the second user device 302. The processor 502 determines the context features based on one or more of the received second digital media 308, the received sensor data, and the user profile of the user of the second user device 302 as described in the foregoing description of FIGS. 1A-1B, 2, 3A-3B, 4A-4B, and 5.

At 608, the context vector representing the context associated with the received second digital media 308 and the second user 402 is computed based on the correlation of the determined one or more context features. The processor 502 computes the context vector representing the context associated with the received second digital media 308 and the second user 402 as described in the foregoing description of FIGS. 1A-1B, 2, 3A-3B, 4A-4B, and 5.

At 610, the computed context vector is compared with the plurality of context vectors. The processor 502 compares the computed context vector with the plurality of context vectors as described in the foregoing description of FIGS. 1A-1B, 2, 3A-3B, 4A-4B, and 5.

At 612, a multimedia content, from the plurality of multimedia content 210-220, is selected based on the comparison of the computed context vector with the plurality of context vectors. The processor 502 selects the multimedia content, from the plurality of multimedia content 210-220, based on the comparison of the computed context vector with the plurality of context vectors as described in the foregoing description of FIGS. 1A-1B, 2, 3A-3B, 4A-4B, and 5.

At 614, an augmented reality presentation is rendered in which the selected multimedia content is superimposed on the first target object 104. The processor 502 renders the augmented reality presentation in which the selected multimedia content is superimposed on the first target object 104. The augmented reality presentation is hyper-personalized to map to the context associated with the second user 402 as described in the foregoing description of FIGS. 1A-1B, 2, 3A-3B, 4A-4B, and 5.

The disclosed methods encompass numerous advantages. The disclosed methods, describe an augmented reality-based content creation and sharing ecosystem that facilitates creation and sharing, among users, of content (e.g., videos) that can be viewed in the virtual environment (e.g., an augmented reality environment). The environments 100A and 100B of FIGS. 1A and 1B enable sharing of content (the first content) that is linked to a specific image (e.g., the first image) or a specific physical object, allowing a user to access content by simply pointing a camera towards the specific image or physical object. The disclosed methods have the potential to revolutionize the way humans interact with each other. For example, a gift received by a user (e.g., the second user) may be associated with an event or a memory. Content (e.g., video, audio, or the like) can be linked to the gift, enabling the user to relive a memory associated with the gift by simply pointing a camera (e.g., the camera included in the second user device 302) at the gift. Further, virtual objects or augmented reality elements (e.g., the first augmented reality element) can be captured by the user (e.g., the second user), allowing for meaningful exchange of virtual gifts (e.g., virtual flowers, virtual pets, or the like) between users. Therefore, the augmented reality-based content creation and sharing system (e.g., the augmented reality system) enhances a perceived utility of gifts and improves interaction of users with their gifts.

The augmented reality-based content creation and sharing ecosystem enables organizations to undertake more innovative and interactive marketing campaigns. For example, an organization can create content (e.g., an advertisement video) that is viewable when a user (e.g., the second user), using a corresponding user device, scans a billboard associated with the organization. The advertisement video may appear to be overlaid on the billboard, leading to unique experience for the user viewing the advertisement video. Similarly, an apparel company may create content (e.g., advertisement video) for each of its store keeping units (SKUs) on display in a store, enabling shoppers who scan a corresponding barcode to view a video of a model wearing a corresponding garment. Similarly, an organization may enable users to receive virtual merchandise (e.g., augmented reality elements such as virtual wall art, virtual mementos, or the like) by scanning an image or product associated with the organization. In another example, multimedia content may be created for business cards. Such content is viewable when a user (e.g., the second user), using a corresponding user device, scans the business card. A profile summary may appear to be overlaid on the business card, leading to unique experience for the user viewing the profile summary. Further, the business card may be mapped to profile summaries in different languages. In one scenario, a profile summary in English may be selected when the viewer is determined to understand English; however, if the viewer understands French, a profile summary in French may be rendered.

Techniques consistent with the disclosure provide, among other features, hyper-personalized augmented objects. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

While various embodiments of the disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure.

We claim:

1. A system, comprising:

a memory configured to store a database, wherein the database includes:

a mapping between a plurality of multimedia content and a first target object, and a plurality of context vectors of the plurality of multimedia content, wherein each of the plurality of context vectors corresponds to a numerical representation of a context of a corresponding multimedia content of the plurality of multimedia content;

a transceiver configured to:

receive a digital media being captured by one or more imaging devices associated with a mobile device, wherein the digital media displays the first target object; and receive sensor data generated by one or more sensors of the mobile device, wherein the sensor data is generated by the one or more sensors during the capture of the digital media; and a processor configured to:

determine one or more context features based on one or more of the digital media, the sensor data, and a user profile of a user of the mobile device;

compute a context vector representing a context associated with the digital media and the user based on a correlation of the determined one or more context features;

compare the computed context vector with the plurality of context vectors;

select, from the plurality of multimedia content, a multimedia content based on the comparison of the computed context vector with the plurality of context vectors; and render, on a display of the mobile device, an augmented reality presentation in which the selected multimedia content is superimposed on the first target object displayed in the digital media, wherein the augmented reality presentation is hyper-personalized to map to the context associated with the user.

2. The system as claimed in claim 1, wherein the processor is configured to:

process the digital media to identify the first target object in the digital media; and search the database to retrieve the plurality of multimedia content mapped to the first target object based on the identification of the first target object in the digital media.

3. The system as claimed in claim 2, wherein the identification of the first target object includes identification of one or more of a shape, a size, a surface curvature, and a three-dimensional model of the first target object.

4. The system as claimed in claim 3, wherein the processor is further configured to transform the selected multimedia content in accordance with at least one of the shape, the size, and the surface curvature of the first target object, wherein the selected multimedia content is transformed prior to the superimposition on the first target object, and wherein the multimedia content superimposed on the first target object is the transformed multimedia content.

5. The system as claimed in claim 1, wherein the processor is configured to:

identify a second target object in the digital media;

select another multimedia content from the database based on the identification of the second target object in the digital media; and update, on the display of the mobile device, the augmented reality presentation to superimpose the selected other multimedia content on the second target object.

6. The system as claimed in claim 5, wherein the other multimedia content is superimposed on the second target object concurrently with the multimedia content being superimposed on the first target object.

7. The system as claimed in claim 1, wherein the processor is configured to:

detect a trigger action based on one or more of the digital media, the superimposed multimedia content, and the sensor data;

select another multimedia content from the plurality of multimedia content based on the detected trigger action; and update, on the display of the mobile device, the augmented reality presentation to superimpose the selected other multimedia content concurrently with the multimedia content on the first target object.

8. The system as claimed in claim 1, wherein the processor is configured to:

detect a trigger action based on the digital media and the sensor data; and manipulate the multimedia content superimposed on the first target object in accordance with the trigger action to create a perception of the multimedia content being altered in response to the trigger action.

9. The system as claimed in claim 8, wherein the trigger action is one of a gesture made by the user of the mobile device and an environmental input recorded in one of the digital media and the sensor data.

10. The system as claimed in claim 8, wherein the processor manipulates the multimedia content superimposed on the first target object in accordance with the trigger action after a time delay.

11. The system as claimed in claim 1, wherein the transceiver is configured to:

receive, from the mobile device, a signal indicating that a first gesture is made by the user on a multimedia item being displayed during the augmented reality presentation; and receive, from the mobile device, another signal indicating that a second gesture is made by the user as a follow-up to the first gesture, wherein the other signal includes an image frame captured by the mobile device at the time the second gesture was made by the user.

12. The system as claimed in claim 11, wherein the processor is configured to:

map the multimedia item with the image frame captured by the mobile device at the time the second gesture was made by the user; and store the mapping between the multimedia item and the image frame in the database for subsequent augmented reality presentation.

13. The system as claimed in claim 1, wherein the processor is configured to authenticate the user of the mobile device prior to rendering the augmented reality presentation based on authentication information received from the mobile device.

14. The system as claimed in claim 13, wherein the authentication information includes one or more of a faceprint of the user, a fingerprint of the user, an iris scan of the user, a retina scan of the user, a voiceprint of the user, a facial expression code, a secret code, a secret phrase, a public key, and an account identifier-password pair.

15. The system as claimed in claim 1, wherein the transceiver is configured to stream the selected multimedia content to the mobile device for rendering the augmented reality presentation on the mobile device.

16. The system as claimed in claim 1, wherein the plurality of multimedia content includes two or more of a video content, an audio-video content, special effects, three-dimensional virtual objects, augmented reality filters, and emoticons.

17. The system as claimed in claim 1, wherein the digital media is one of a live image, a live video, an image of another image, and a video of another video.

18. The system as claimed in claim 1, wherein the digital media is one of a two-dimensional (2.D) image, three-dimensional (3D) image, a 2D video, and a 3D video.

19. The system as claimed in claim 1, wherein the one or more context features include at least one of demographics of the user, a geo-location of the mobile device, a current season, a current timestamp, identity variables of the user, a travel history of the user, event information associated with the user, and current affairs information.

20. A method, comprising the steps of:

storing, by a memory of a system, a database including:

a mapping between a plurality of multimedia content and a first target object, and a plurality of context vectors of the plurality of multimedia content, wherein each of the plurality of context vectors corresponds to a numerical representation of a context of a corresponding multimedia content of the plurality of multimedia content;

receiving, by a transceiver of the system, a digital media being captured by one or more imaging devices associated with a mobile device, wherein the digital media displays the first target object;

receiving, by the transceiver of the system, sensor data generated by one or more sensors of the mobile device, wherein the sensor data is generated by the one or more sensors during the capture of the digital media;

determining, by a processor of the system, one or more context features based on one or more of the digital media, the sensor data, and a user profile of a user of the mobile device;

computing, by the processor of the system, a context vector representing a context associated with the digital media and the user based on a correlation of the determined one or more context features;

comparing, by the processor of the system, the computed context vector with the plurality of context vectors, selecting, by the processor of the system, from the plurality of multimedia content, a multimedia content based on the comparison of the computed context vector with the plurality of context vectors; and rendering, by the processor of the system, on a display of the mobile device, an augmented reality presentation in which the selected multimedia content is superimposed on the first target object displayed in the digital media, wherein the augmented reality presentation is hyperpersonalized to map to the context associated with the user.

\* \* \* \* \*